US011441810B2

(12) United States Patent
Duffy

(10) Patent No.: US 11,441,810 B2
(45) Date of Patent: Sep. 13, 2022

(54) PRE-FABRICATED MODULAR FIRE-RATED CONDUIT ASSEMBLY

(71) Applicant: Durasystems Barriers Inc., Vaughan (CA)

(72) Inventor: William Christopher Duffy, Thornhill (CA)

(73) Assignee: DURASYSTEMS BARRIERS INC.

( * ) Notice: Subject to any disclaimer, the term of this patent is extended or adjusted under 35 U.S.C. 154(b) by 673 days.

(21) Appl. No.: 15/820,275

(22) Filed: Nov. 21, 2017

(65) Prior Publication Data

US 2019/0154295 A1 May 23, 2019

(51) Int. Cl.
*F16L 59/14* (2006.01)
*F24F 13/02* (2006.01)

(52) U.S. Cl.
CPC ........ *F24F 13/0263* (2013.01); *F16L 59/143* (2013.01); *F24F 13/0209* (2013.01); *F24F 13/0272* (2013.01); *F24F 13/0281* (2013.01)

(58) Field of Classification Search
CPC ......... F16L 59/143; F16L 39/00; F16L 23/14; F24F 13/0263; F24F 13/0209; F24F 13/0272; F24F 13/0281

(Continued)

(56) References Cited

U.S. PATENT DOCUMENTS 2,916,054 A 12/1959 Callan
4,029,344 A 6/1977 Stone (Continued)

FOREIGN PATENT DOCUMENTS

CA 2829645 4/2015
CN 2233059 8/1996

OTHER PUBLICATIONS

Canadian Office Action for Application No. 2,800,362 dated Nov. 7, 2019.

(Continued)

*Primary Examiner* — Aaron M Dunwoody
(74) *Attorney, Agent, or Firm* — Workman Nydegger

(57) ABSTRACT

A modular fire-rated conduit or duct assembly suitable for applications such as ventilation systems in a multi-floor or multi-room building. According to an embodiment, the modular fire-rated conduit assembly comprises two or more duct or conduit sections, each of the duct sections includes an inner duct liner and an outer casing, and a plurality of casing spacers configured to form a thermal insulating cavity between at least a portion of space between the inner duct liner and the outer casing, and the thermal insulating cavity is configured to receive a thermal material, a first exterior flange connector is attached to one end of each of the inner duct liners, a second exterior flange connector attached to another end of each of the inner duct liners, the first and the second exterior flange connectors are configured to form an assembly junction for coupling respective ends of the duct or conduit sections to form a connected run of the conduit or duct sections, and a joint connection end is formed between the exterior flange connector and the outer casing, and the joint connection end is configured to receive a joint insulating material, and further includes a return configured to receive a connection edge of a joint cover, and the joint cover is configured to encapsulate the joint connection ends of adjacent duct sections modules.

9 Claims, 12 Drawing Sheets

(58) Field of Classification Search
USPC ..... 285/363, 368, 405, 412, 123.16, 123.15, 285/424
See application file for complete search history.

(56) References Cited

U.S. PATENT DOCUMENTS

| | | | |
|---|---|---|---|
| 4,724,750 A | 2/1988 | Coleman | |
| 7,699,078 B1 * | 4/2010 | Husmann, Jr. | F24F 13/0245 138/114 |
| 9,074,788 B2 | 7/2015 | Duffy | |
| 9,371,941 B1 * | 6/2016 | Faverio, IV | F24F 13/0263 |
| 2003/0051764 A1 * | 3/2003 | Jungers | B29C 41/22 138/149 |
| 2005/0116470 A1 | 6/2005 | Duffy | |
| 2011/0194894 A1 * | 8/2011 | Seraphinoff | F16L 23/14 403/338 |
| 2013/0174934 A1 * | 7/2013 | Duffy | F16L 59/147 138/149 |
| 2015/0101697 A1 * | 4/2015 | Duffy | F16L 9/003 138/149 |
| 2018/0087700 A1 * | 3/2018 | Plantz, Jr. | F16L 39/005 |

OTHER PUBLICATIONS

Canadian Office Action for Application No. 2,800,362 dated Feb. 27, 2019.
Canadian Office Action for Application No. 2,829,645 dated Oct. 18, 2019.
International Search Report for PCT/CA2018/051473 dated Feb. 13, 2019.
Written Opinion for International Search Report for PCT/CA2018/051473 dated Feb. 13, 2019.

* cited by examiner

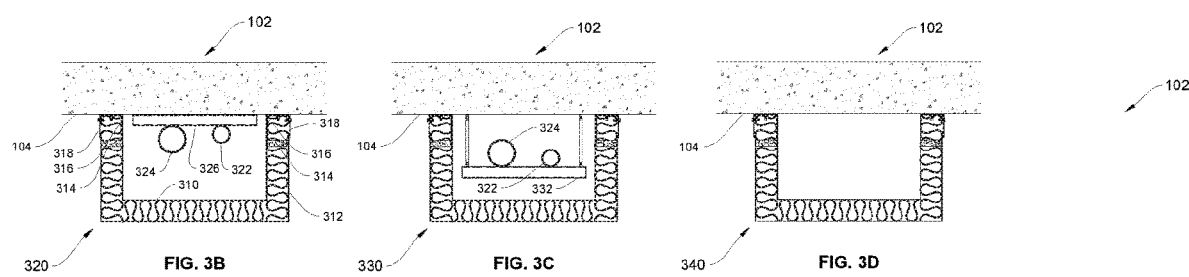
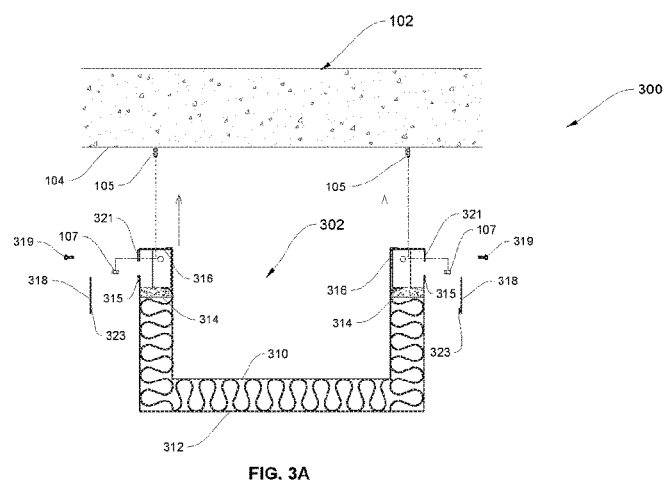

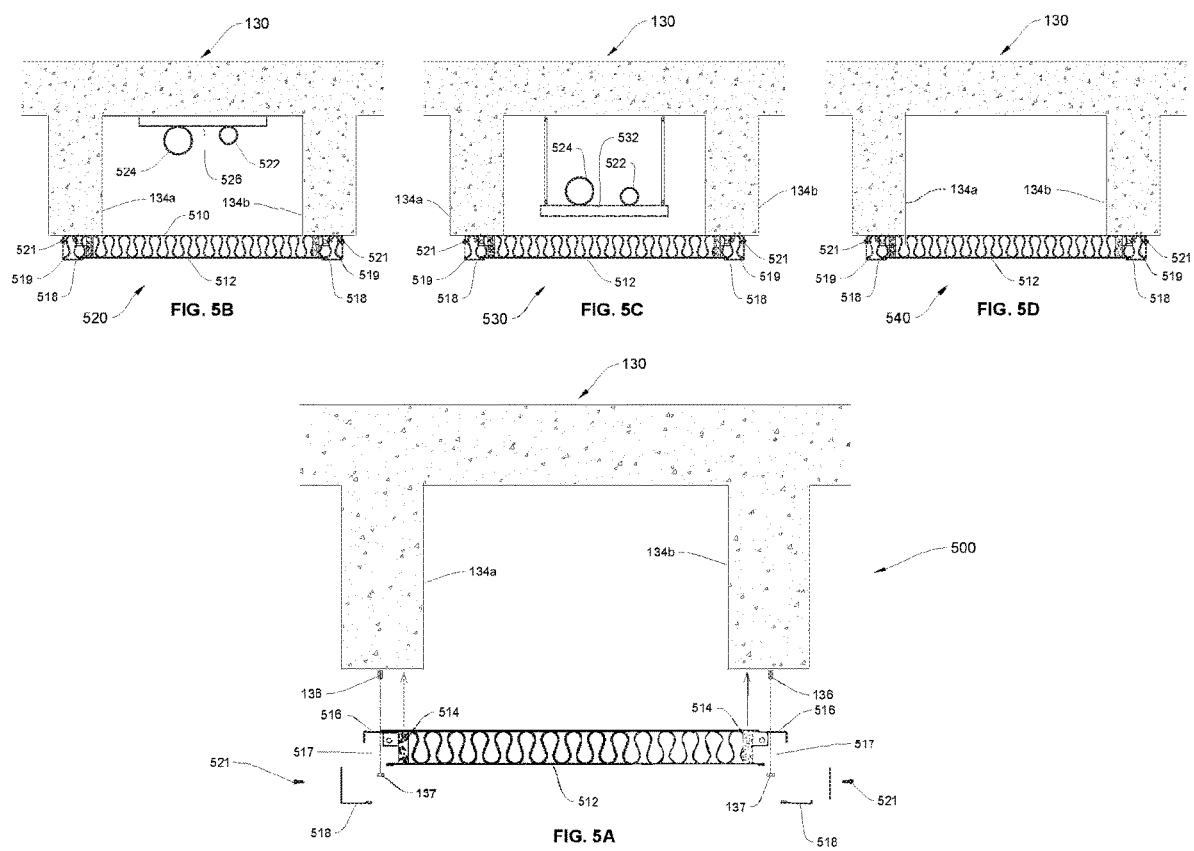

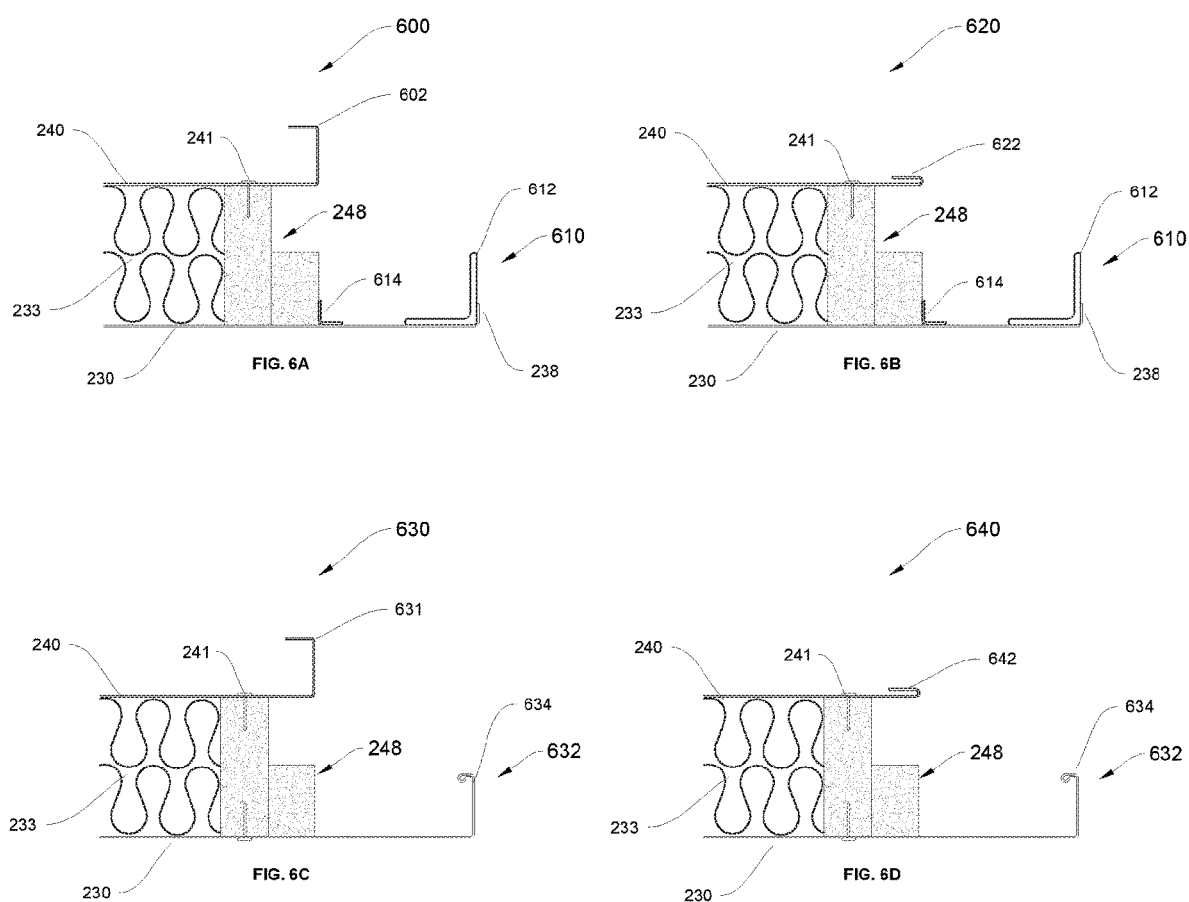

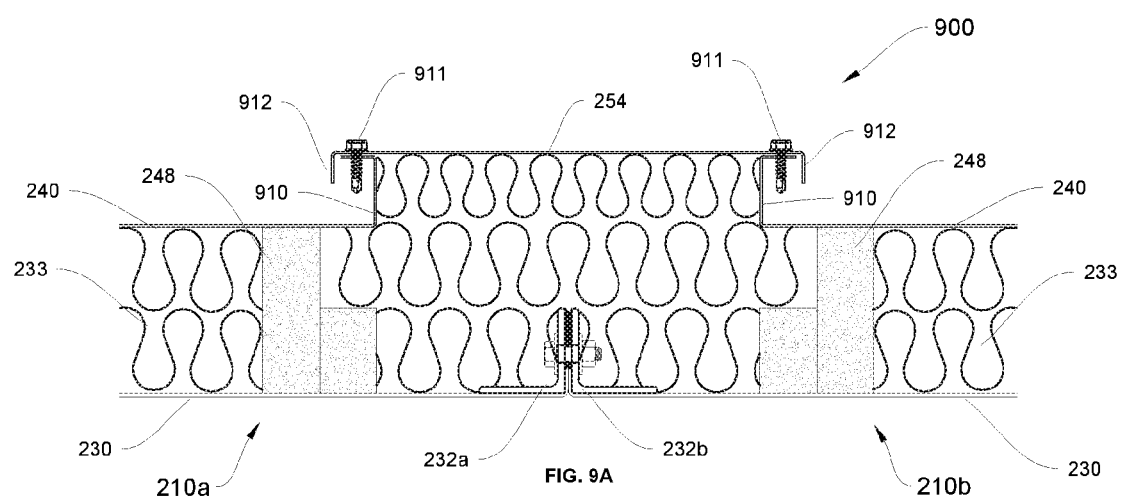
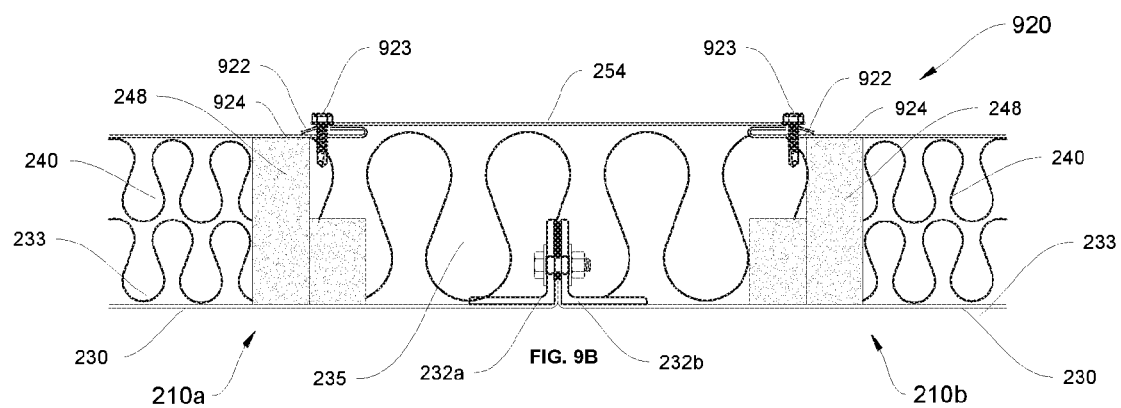

PRE-FABRICATED MODULAR FIRE-RATED CONDUIT ASSEMBLY

BACKGROUND

1. Technical Field

The present invention relates to duct assemblies, and more particularly to a factory or pre-fabricated modular fire-rated conduit apparatus.

2. Related Technology

Current building codes require fire rated shaft type enclosure systems to protect mechanical and electrical services that pass through multiple fire compartments. Depending on the type of building and how the building is configured, a fire compartment can be a single room, a portion of a plant, or the entire floor or level of a building. As building size, height, and use vary, so will the fire rating requirements of the shaft construction with most installations requiring, for example, 1, 2, 3 or 4-hour fire ratings.

Mechanical services that are routed through buildings vary in their fire protection requirements, which are based on the type of service and the hazards associated with that service.

Ventilation ducts that supply fresh or conditioned air, as well as returning or exhausting contaminated air, are common in most buildings. These types of ducts run throughout a building, often traveling the entire height of the building, and have the potential to act as a conduit for fire. Consequently, building codes require these systems be designed to prevent the spread of fire from one compartment or floor to adjacent ones. This is typically accomplished by enclosing the duct, or ducts, in a fire rated shaft construction and installing fire dampers at each duct opening to prevent fire from entering or exiting the duct, so that the fire is contained to the original fire compartment.

When dealing with ducts intended for hazardous materials and/or processes, the design requirements include protecting the duct and its contents from external fires, and also protecting the surrounding spaces or building from the effects of a fire internal to the duct. Examples of these types of ducts include dust or particle collection for wood or paper processing plants, hood exhaust ducts for commercial kitchens where combustible vapors from the grills and fryers are transported from the kitchen to exterior of the building, chutes for handling garbage or laundry, and laboratory exhaust systems where chemical vapors or hazardous biological agents are transported from a laboratory hood to a containment or processing device located in another area of the building, or discharged to the atmosphere.

Mechanical piping systems, similar to duct systems, also fall into two general categories: hazardous and non-hazardous. The fire protection requirements are similar to the requirements for duct systems.

In a building, there are various non-hazardous types of piping systems that are installed throughout the building, for example, supply water lines and drain pipes. These types of piping systems can benefit from being enclosed in a shaft type construction, which allows the services to pass though the building without requiring through penetration firestops at each fire separation. A firestop is only needed where the piping exits the fire rated shaft enclosure.

Hazardous piping, on the other hand, such as fuel oil fill and vent piping, medical gas piping, and other specialized process pipes that contain flammable or combustible contents, require protection from external fire, as well as protection from the possible spread of internal fire through ignition of the hazardous contents of the pipe. Building codes of some jurisdictions, for example, in New York City, require that oil fill and vent piping be enclosed by a system that provides fire protection as well as liquid tight containment in the event an oil pipe fails. The containment requirement is to ensure any leaked fuel cannot escape the enclosure preventing the fuel from contributing to or causing a fire inside the building.

Unlike mechanical duct and piping systems where the fire threat could be from the contents of the mechanical service as described above, modern electrical cabling tends to have jackets or outer coverings formed from materials that self-extinguish once an external flame is removed from the cable. Consequently, a principal design requirement for electrical cabling is maintaining operation of the electrical services. As the cable or cable jacket themselves are not a threat, protection of electrical serves tends to focus more on protecting the electrical service from external fire sources so continued operation can be ensured in the event of a fire. Electrical cabling that handles critical services like building power, backup generator power, life safety communication cables, and building security are examples of electrical systems suitable for or requiring fire protection, based on the type of building or structure with the electrical service installation.

Accordingly, there remains a need for improvements in the art including fire rated shaft designs.

BRIEF SUMMARY

The present invention is directed to a factory or pre-fabricated modular fire-rated conduit assembly apparatus and system.

According to one aspect, the present invention comprises a modular fire-rated exhaust duct assembly comprising, two or more exhaust duct modules; each of said exhaust duct modules having an inner duct liner and an outer casing, and a plurality of casing spacers configured to form a thermal insulating cavity between at least a portion of space between said inner duct liner and said outer casing, said thermal insulating cavity being configured for receiving an insulation material; a first exterior flange connector formed or attached to one end of each of said inner duct liners; a second exterior flange connector formed or attached to another end of each of said inner duct liners; said first and said second exterior flange connectors being configured to form a field assembly junction for coupling respective ends of said exhaust duct modules to form a connected exhaust duct run; and a joint connection end formed between said exterior flange connector and said outer casing, said joint connection end being configured to receive a joint insulating material, and further comprising a return configured for receiving a connection edge of a joint cover, said joint cover being configured to encapsulate said joint connection ends of adjacent exhaust duct modules.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which:

FIG. 3A shows a three-sided conduit configuration according to an embodiment of the present invention;

FIG. 3B shows the three-sided conduit configured for a horizontal or vertical services conduit application or installation;

FIG. 3C shows the three-sided conduit configured for a horizontal services conduit application or installation;

FIG. 3D shows the three-sided conduit configured for a horizontal or vertical air conduit application or installation;

FIG. 5A shows a one-sided, or flat, conduit panel according to an embodiment of the present invention;

FIG. 5B shows the one-sided conduit configured for a horizontal or a vertical services conduit for handling air or enclosing mechanical/electrical services installed in a void comprising a fire rated construction in a conduit installation;

FIG. 5C shows the one-sided conduit configured for a horizontal services conduit application or installation, for instance, comprising suspended building services;

FIG. 5D shows the one-sided conduit configured for a horizontal or vertical air conduit application or installation;

FIG. 6A shows a conduit comprising a liquid tight inner construction, and comprising a raised joint insulation cover, according to an embodiment of the present invention, and suitable for hazardous or combustible contents and a containment system;

FIG. 6B shows the conduit of FIG. 6A comprising a flat joint insulation cover according to an embodiment of the present invention;

FIG. 6C shows a conduit configured for air or building services installation, and comprising a raised joint insulation cover, according to an embodiment of the present invention;

FIG. 6D shows the conduit of FIG. 6C comprising a flat joint insulation cover according to an embodiment of the present invention;

FIG. 9A shows a screw-on raised joint cover according to an embodiment of the present invention; and FIG. 9B shows a screw-on flush joint cover according to an embodiment of the present invention.

Like reference numerals indicate like or corresponding elements or components in the drawings.

DETAILED DESCRIPTION

Figure 1A:
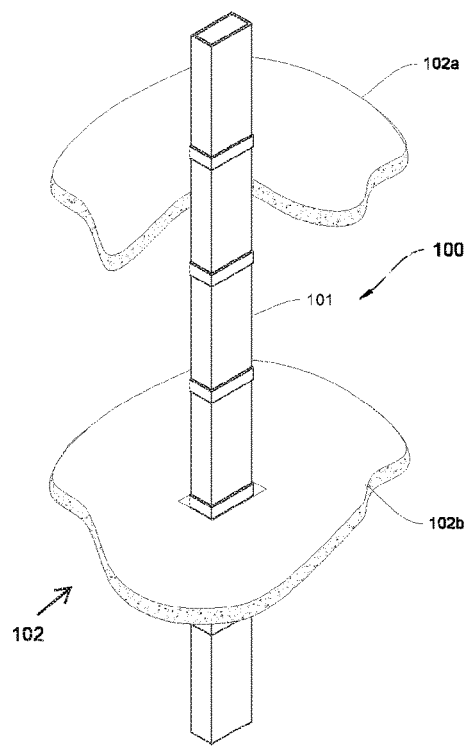
FIG. 1A shows in diagrammatic form a rectangular vertical conduit installation configured for a closed system from origin to discharge.

Reference is first made to FIG. 1A, which shows a hazardous/combustible materials fire-rated duct or conduit assembly or configuration according to an embodiment of the present invention and indicated generally by reference 100. According to an exemplary implementation, the hazardous materials conduit or duct assembly 100 comprises a closed vertical configuration 101 with a fire separation floors 102, indicated individually by references 102a and 102b, in FIG. 1. In a vertical configuration, the conduit passes through horizontal floors or fire separation barriers. The closed conduit assembly 100 is intended for hazardous and/or combustible materials and does not have any openings (other than at an originating fire compartment and/or a destination fire compartment), which could allow for the escape of hazardous material and/or spread of fire from one fire compartment to another fire compartment in a building. As will be described in more detail below the conduit assembly 100 comprises a plurality of modular duct sections that are joined or connected together and configured for the particular application or installation.

Figure 1B:
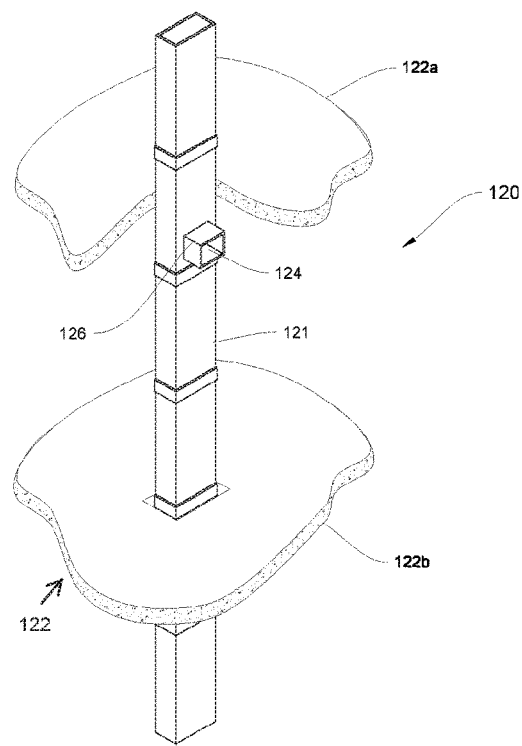
FIG. 1B shows a conduit installation for a ventilation system where there are inlets or outlet in the system other than the origin or discharge openings.

FIG. 1B shows an open conduit assembly or configuration according to an embodiment of the present invention and indicated generally by reference 120. As shown in FIG. 1B, the open conduit assembly 120 comprises a vertical conduit assembly 121 which passes through floors 122 in a building. The floors 122 comprise fire separation floors indicated individually by references 122a and 122b. The vertical conduit assembly 121 includes one or more openings 124 between the originating fire compartment and the destination compartment. The conduit assembly 120 is configured for moving air under positive or negative pressures where branch conduits are required to handle air for other parts of the building.

The duct assemblies 100 and 120 are also suitable for conduits containing mechanical or electrical systems, and can comprise branch runs or outlets in multiple locations in a building to provide services to those areas. It will also be appreciated that the fire-rated duct assemblies 100 and 120 can be configured horizontally to run through walls, including vertical fire barriers, or in combination of vertical and horizontal connected segments or sections, for example, the vertical duct assembly 121 with a horizontal branch indicated generally by reference 126. According to another embodiment, the fire-rated duct assembly comprises a conduit spanning or running between horizontal and/or vertical fire barriers, without penetrating or passing through the barrier(s). For instance, the duct assembly terminates at and is attached to one face of the fire barrier, and the next section in the duct assembly is attached to the opposite face of the fire barrier and continues a run or span to the next fire barrier. According to an exemplary embodiment, the sections of the fire-rated duct assemblies are attached to the face of the fire barriers as described in more detail below with reference to FIGS. 3A to 3D.

Figure 2A:
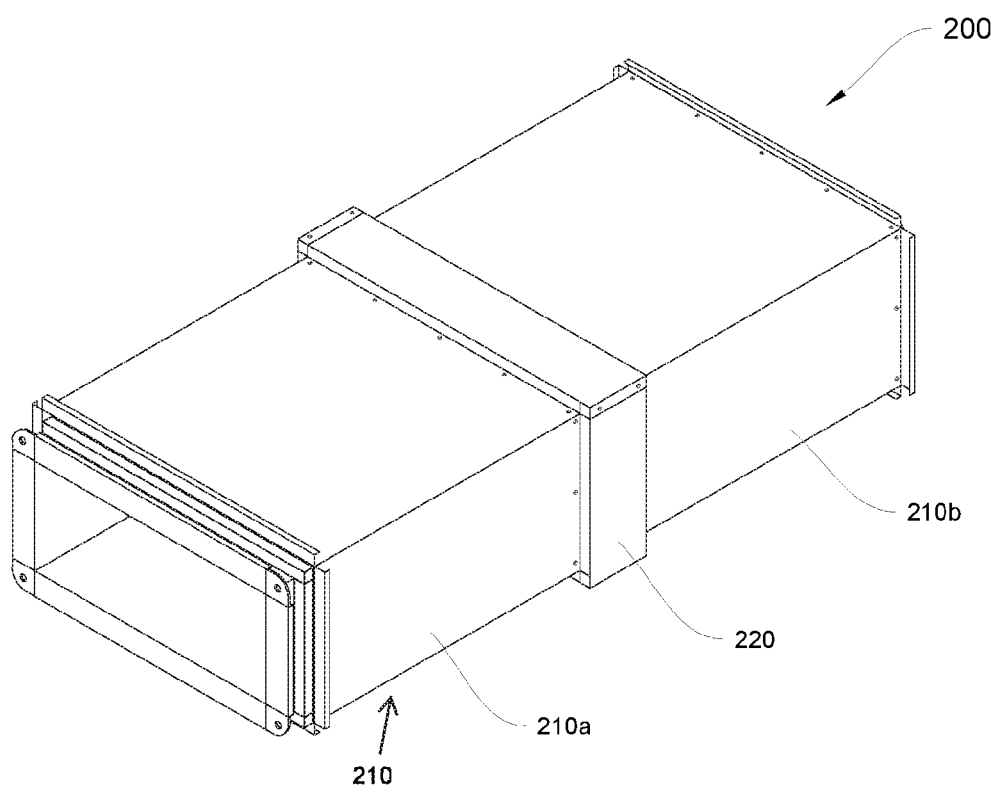
FIG. 2A shows a rectangular duct assembly according to an embodiment of the present invention comprising two connected rectangular conduit or duct sections.

Reference is next made to FIG. 2A, which shows a fire-rated conduit or duct assembly according to an embodiment of the invention and indicated generally by reference 200. The fire-rated conduit assembly 200 comprises a plurality of duct sections 210, indicated individually by reference 210a and 210b in FIG. 2A, and a connection or joint mechanism indicated generally by reference 220. According to an exemplary embodiment, the duct sections 210 have a rectangular cross-section or configuration. The duct sections 210 are fabricated in a factory before being transported to the installation location or site, and then joined or connected together using connection mechanisms to create a continuous conduit system or assembly, as described in more detail below.

In addition to a rectangular cross-section, the duct sections 210 can be configured with other cross-sectional shapes or profiles. According to other embodiments, the duct sections 210 comprise square, round, or oval cross-sectional shapes or profiles. The cross-sectional shape is determined based on various factors, such as the application or intended use, the space available for installing the conduit, and even the designer's personal preference as to conduit cross section. For instance, a round or oval cross-section is often utilized when the duct assembly 100 is configured for handling combustible particulate materials, as it allows for smoother material flow, and assists in preventing the accumulation of the particulate in any one area of the conduit system reducing the potential for a fire internal to the conduit. In addition, the duct assembly 100, 120 can include other sections or components, such as the branch duct section 124 shown in FIG. 1B, and/or other sections such as elbows and offsets, as well as shapes required to change conduit size such as transitions or reducers.

Figure 2B:
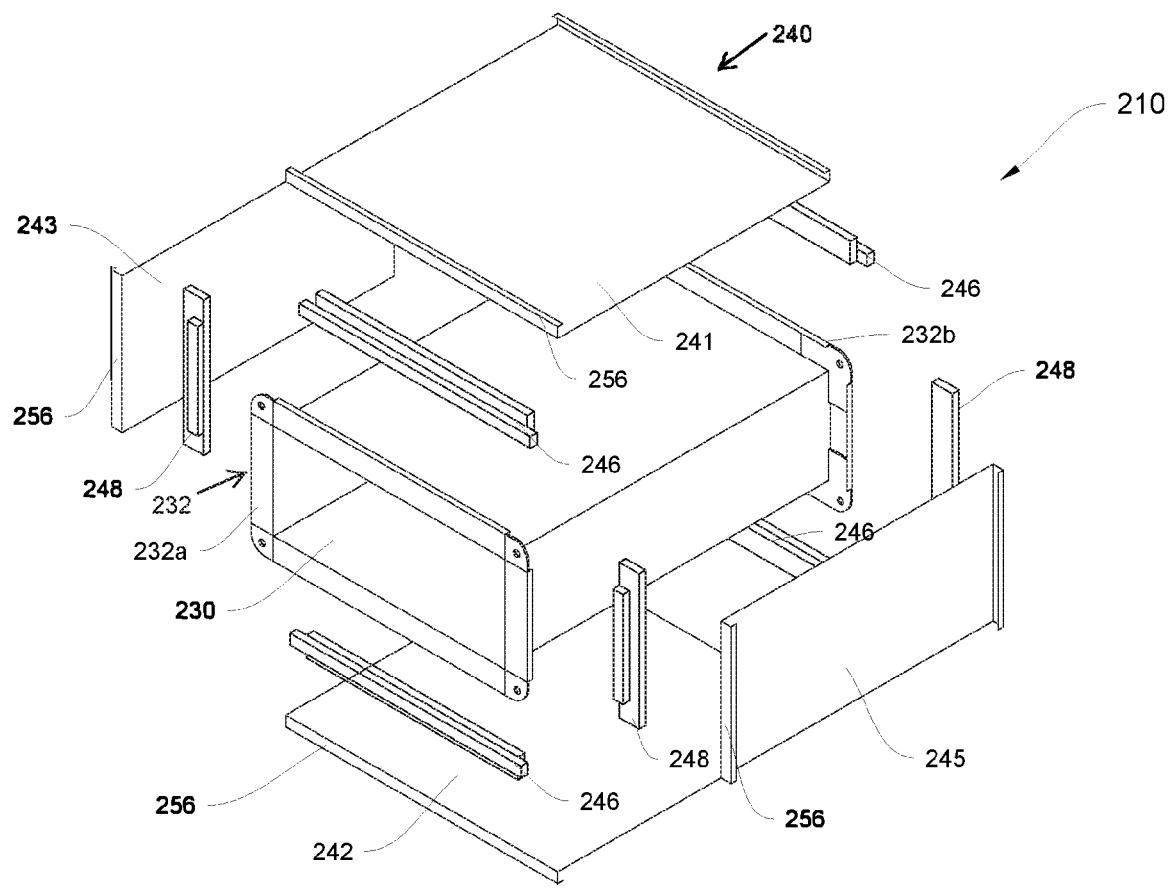
FIG. 2B is an exploded view of one of the rectangular conduit section of FIG. 2A.
Figure 2C:
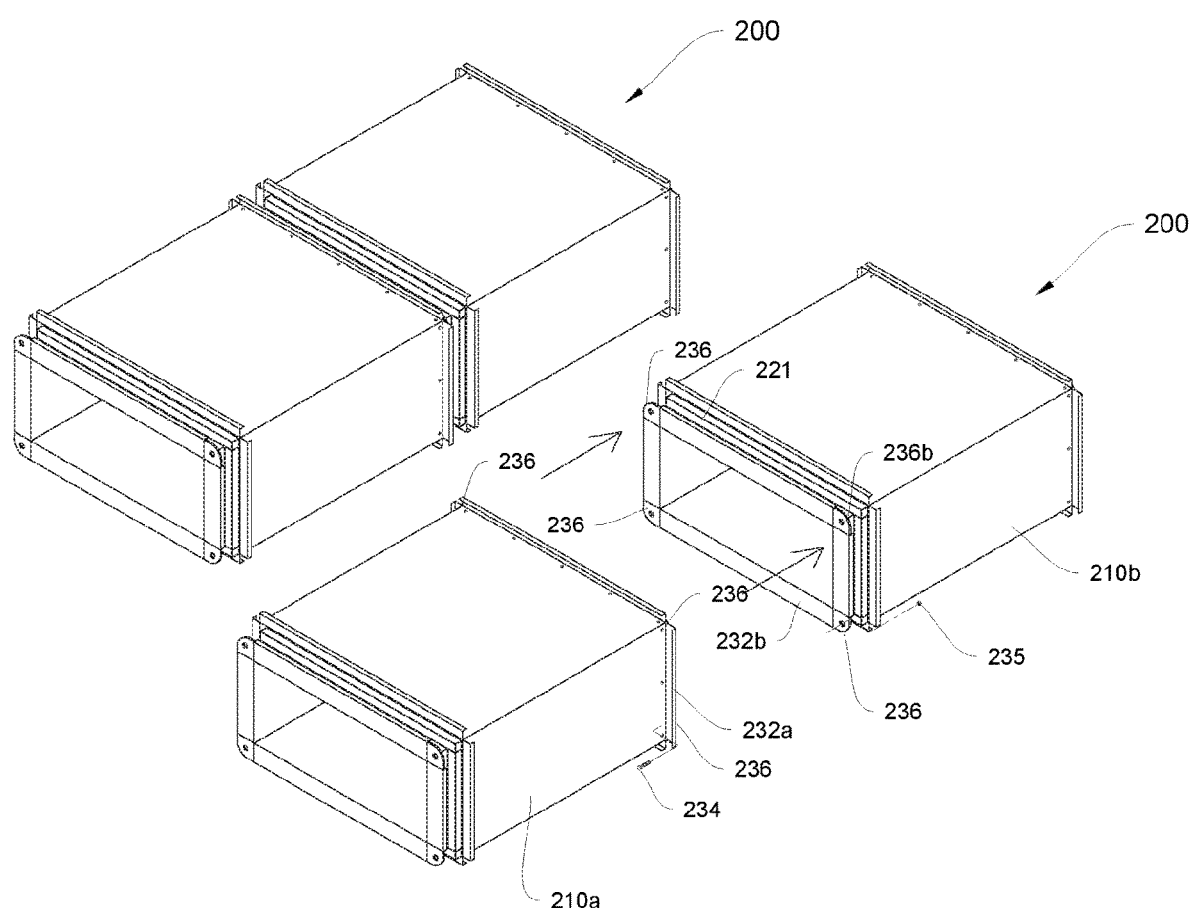
FIG. 2C shows a process or method for connecting the two rectangular conduit sections together according to an embodiment.
Figure 2D:
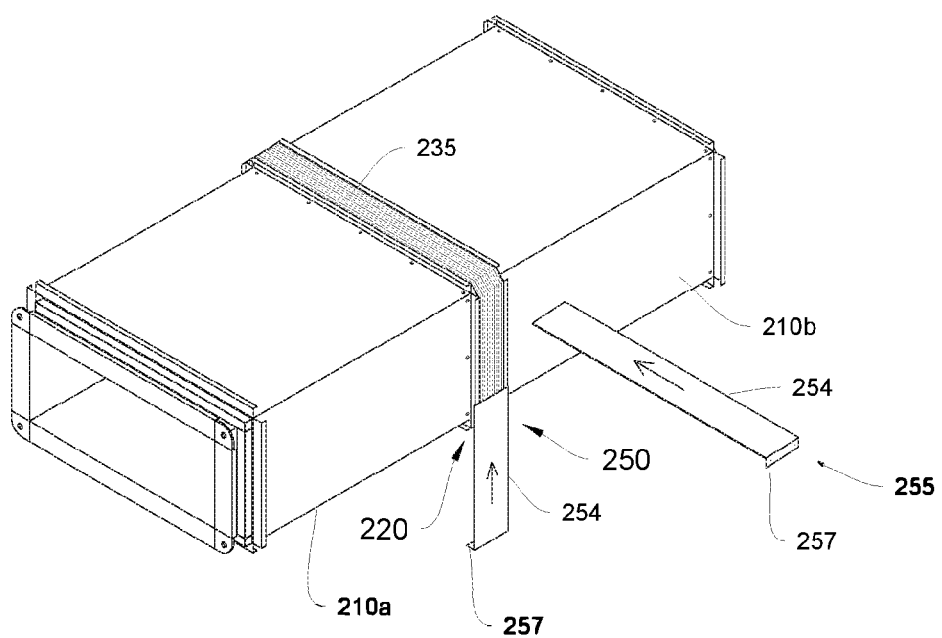
FIG. 2D shows the two connected rectangular conduit sections of FIG. 2C, with a joint insulation and cover configuration according to an embodiment.

Reference is made to FIG. 2B, which shows an exploded view of the individual or modular duct section 210 according to an embodiment. The duct section 210 comprises an inner duct 230 with an inner duct connector 232, indicated individually by references 232a and 232b in FIG. 2B, at opposing ends of the duct section 210. The inner duct connector 232 comprises a flange or an angled connector which is configured to join respective duct sections 210 together, for example, using respective bolts 234 and nuts 235, as shown in FIG. 2C, or other suitable fasteners, and with the addition of a gasket or joint sealant, as described in more detail below. The inner duct connector 232 can be formed as a separate component, for instance, an angled connector, that is fastened to the end of the inner duct 210, for example, bolted and/or welded. According to another embodiment, the inner duct connector 232 is formed as integral component of the inner duct 210. The modular duct section 210 comprises an outer protective casing indicated generally by reference 240. According to an embodiment, the outer protective casing 240 comprises top 241 and bottom 242 panels and side panels indicated individually by references 243 and 245. According to an exemplary implementation, the outer casing 240 is fabricated from a fire resistant metallic material. In order to provide a thermal insulation cavity, the respective panels of the outer protective casing 240 are positioned and attached to the inner duct 230 in a spaced relationship using casing spacers, comprising top and bottom panel casing spacers indicated by references 246 and side panel casing spacers indicated by references 248. According to an exemplary embodiment, the casing spacers 246, 248 are fabricated or formed using a thermally insulating (i.e. thermally non-conductive) material. The outer casing panels 240 are affixed to the casing spacers, which are held in position or fixed to the inner duct 230 using suitable fastening techniques. A cavity or void space is formed between the outer casing 240 and the inner duct liner 230 and thermal insulation material 233 is placed inside the cavity, as described in more detail below, and shown, for example, in FIGS. 8A-8C and 9A-9B. As shown in FIG. 2D, the fire-rated conduit or duct assembly includes a joint or connection mechanism 220 comprises an insulating material 235 which is applied or positioned on or around the joined or connected ends of the respective duct sections 210. The joint mechanism 220 further comprises a joint cover 250. According to an embodiment, the joint cover 250 comprises top and bottom joint covers indicated by references 254 and side joint covers indicated by references 254 to protect and hold the insulating material 235 in place or position between the joined ends of the duct sections 210. According to an exemplary implementation, the joint covers 254 are fabricated from a fire resistant metal and are configured to slide into the gap between the respective ends of the duct sections 210 and fixed or held in position using screws or other suitable fasteners, indicated generally by reference 255 in FIG. 2D.

According to an exemplary embodiment, the inner duct liner 230 is fabricated from flat sheet metal or a continuous metal strip, with a thickness sufficient to remain intact and maintain the conduit shape for the prescribed fire-rating or duration. The thickness of the inner duct 230 can be increased for applications where the conduit contents impart additional loading or abrasion requirements. The inner duct liner 230 may be fabricated from carbon, galvanized, stainless, or coated steel. The inner duct 230 is formed as a tube comprising a rectangular, square, round, or oval cross section, as determined by the specific application or project requirements. For a rectangular or square cross section, the inner duct liner 230 can be fabricated using four individual panels, a 'U' shaped section with a separate closing panel, two 'L' shaped sections or a single wrap around section. For a circular or oval cross section, the inner duct 230 can be fabricated from individual pieces of flat metal formed to the required shape, or formed from a spiral wound continuous strip of metal. In known manner, the abutting longitudinal free edges of the formed or spirally wound tubes are joined or connected using mechanical locks, continuous or stitch welds, lap seams with fasteners or pocket seams with fasteners or stitch welds.

For hazardous or combustible material applications, the duct or conduit assembly 100 is preferably made with continuously welded longitudinal seams to prevent the hazardous or combustible materials being transported by the conduit assembly 100 from escaping the inner conduit. For non-hazardous applications, such as air handling, or for routing or housing mechanical and electrical services, the duct or conduit assembly is made with mechanical locks due to their lower cost and ease of use. Where necessary the mechanical locks can also be sealed to reduce any unwanted passage of air from or to the inner conduit.

Reference is again made to FIG. 2C and a process for connecting or joining the two duct sections 210a and 210b together to form a section of the duct assembly 100. As shown, the first duct section 210a is positioned with the mating end, i.e. the inner duct connector 232b in spaced position from the inner duct connector 232a of the second duct section 210b. A gasket or other type of sealing material is applied to the face of one or both of the inner duct connectors 232a and 232b as required. The two duct sections 210a and 210b are then brought together and mechanically joined, for example, utilizing respective bolts 234 and nuts 235, or other suitable mechanical fasteners, inserted and tightened in holes 236 in the corners of the connectors 232a and 232b. For larger duct sections 210, or round or oval duct sections, additional bolts or other types of fasteners, such as screws, cleats, or clamping bands, are utilized for joining or connecting the respective sections.

According to an embodiment, the joint mechanism 220 is configured to provide the fire-rating for the assembled duct or conduit assembly 100 (or 120). As shown in FIG. 2D, the joint mechanism 220 comprises thermal insulation material 235 and the joint cover 250. According to an embodiment, the inner duct 230 and the inner duct connectors 232 are configured to extend beyond the protective outer casing 240 and when joined together a gap or space is created between the end of the joined duct sections 210a and 210b as shown in FIG. 2C and indicated by reference 221. The gap 221 is configured to receive the thermal insulation material 235, and then the top and bottom joint cover sections 254 and the side joint cover sections 254 are installed to seal the gap 221 and the thermal insulation material 235 to provide and maintain the required fire-rating of the duct assembly 100 (or 120). According to an exemplary implementation, the joint cover sections 254 are fabricated from the same material as the panels for the outer casing 140.

The thermal insulation material 235 is selected to have sufficient density and thermal conductivity to limit the transfer of heat from the fire exposed side of the conduit to the non-exposed side so as not to exceed the temperature rise limits of the building construction and materials test standard used to qualify the fire resistance rating of the fire rated conduit. Typical temperature rise limits for nationally recognized codes restrict the average temperature rise to an average of all temperature rise measurements of 250° F. with a maximum single temperature rise measurement of 325° F. Once the opening is filled with the thermal insulation, slide on joint covers, formed of the same material and material thickness as the outer protective casing, are installed by first positioning the ends of the overlapping returns formed on the longitudinal edges of the slide on joint cover parallel to and adjacent to the ends of the returns formed on the outer protective casings.

According to an embodiment, the joint cover sections 254 are configured to be pushed or slid into and held in place by respective returns 256 formed in the panels 241, 242, 244 and 245 of the outer casing 240, as shown in FIGS. 2B and 2D. The returns 256 in the outer casing 240 interlock with returns formed in the joint cover sections 254. For a rectangular configuration, installation of the top, bottom and side joint cover sections 254 envelopes the gap 221, i.e. perimeter ends of the outer casing 240. According to an embodiment, the joint cover sections 254 have a 90° fold or flange formed at one end as shown in FIG. 2D and indicated by reference 257. The flanges 257 facilitate the connection of abutting joint cover sections 254, for example, utilizing screws or other mechanical fasteners, to secure or lock the joint cover sections 254 in place. According to another embodiment, the flange comprises a separately formed angle piece that is fastened to the end of the joint cover section 254 at one surface, and the other surface of the formed angle piece is joined or fastened to the end of the abutting joint cover section. According to another aspect, a formed angle piece is positioned under or over the interface between the adjacent joint cover section so that the thermal insulation is fully enclosed and protected.

Reference is next made to FIG. 3A, which shows a sectional view of a three-sided conduit assembly according to an embodiment of the invention and indicated generally by reference 300. The three-sided conduit assembly 300 is configured to be secured and sealed against a surface of the fire barrier 102 (or 122 in FIG. 1) as indicated by reference 104. The three-sided conduit assembly 300 is suitable for applications where the porosity of the fire barrier or separation floor or wall 102 does not adversely affect the performance of the system, for example, to enclose mechanical and/or electrical services, or to function as an air handling conduit, in horizontal or in vertical configurations.

As shown in FIG. 3A, the three-sided conduit assembly 300 comprises a three-sided configuration with an open side or surface indicated by reference 302. The three-sided conduit 300 comprises an inner duct liner 310 and an outer casing 312. The outer casing 312 and the inner duct liner 310 are separated by casing spacers 314, for example, as described above. As shown in FIG. 3A, each side wall of the conduit assembly 300 includes a conduit mounting channel indicated by reference 316. The conduit mounting channel 316 is configured to provide a joint surface for mounting or securing the respective side wall to the surface 104 of the fire barrier 102. According to an embodiment, an anchor or fastener 105 is installed in the surface 104 of the fire barrier 102 and utilized to attach and secure the conduit mounting channel 316. According to an exemplary implementation, the fastener 105 comprises a threaded stud and the conduit mounting channel 316 (and side wall of the conduit assembly 300) is attached with a threaded nut 107, which is accessed through an opening 317. The opening 317 can be filled with thermal insulation material (as described above) and the opening 317 and conduit mounting channel 316 is closed or sealed with a slide joint cover section indicated by reference 318. The slide joint cover section 318 is secured with one or more screws 319.

According to an embodiment, the conduit mounting channels 316 include a 90° fold or flange 321 which aligns with returns 315 on the outer casing 314, as shown in FIG. 3A.

To install the three-sided conduit 300, a gasket or other suitable sealing material is affixed or applied to either the surface 104 of the fire barrier 102 or to the face of the conduit mounting channel, to create a seal between two mating surfaces and between the inner conduit 310 and the holes in the conduit mounting channel 316. The conduit assembly 300 is moved into position and secured with the conduit fastener or mounting nuts 107 to the anchors 105. The joint cover section 318 includes a return 323 that is formed only along one longitudinal edge. The return 323 in the slide joint cover section 318 is slid over the corresponding return 315 in the outer casing 314 to interlocking the two sections. The slide joint cover sections 318 are secured into place with joint cover section retaining screws 319, and the joint section in the three-sided conduit 300 is enclosed and configured to provide the required fire-rating.

According to another embodiment, the anchors 105 in the fire barrier 102 comprise threaded sockets and the conduit mounting nut 319 is replaced with a matching threaded bolt.

Reference is next made to FIGS. 3B to 3D, which depict exemplary implementations and applications of the three-sided conduit assembly 300. FIG. 3B shows the three-sided conduit assembly 300 configured or installed as a services conduit, in a horizontal or a vertical configuration, and indicated generally by reference 320. In an exemplary installation, mechanical 322 and/or electrical 324 service fixtures or components, are affixed to a surface mount 326 and enclosed by the conduit formed between the three-sided conduit assembly 300 and the surface 104 of the fire barrier 102. FIG. 3C shows the three-sided conduit assembly 300 configured as a services conduit 330 where the mechanical 322 and electrical services 324 are supported or carried by a suspended mounting platform 332 as shown. FIG. 3D shows the three-sided conduit assembly 300 configured as an air conduit 340. The three-sided conduit assembly 300 can be configured to run a horizontal air duct or a vertical air duct according to the orientation of the fire barrier 102, e.g. ceiling or wall. In addition to the generally rectangular cross-sectional shape, the three-side conduit assembly 300 can be configured with duct sections having other profile shapes, for instance, a half-circle or half-oval shape.

Figure 4B:
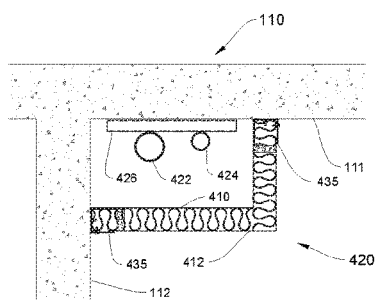
FIG. 4B shows the two-sided conduit configured for a horizontal or a vertical services conduit, for handling air or enclosing, for instance, mechanical/electrical services connected to intersecting fire rated construction to complete the conduit.
Figure 4C:
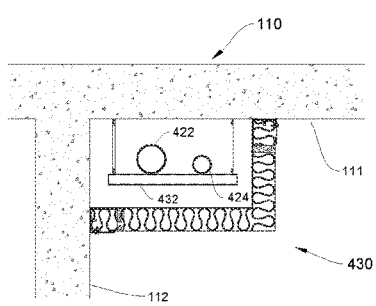
FIG. 4C shows the two-sided conduit configured for a horizontal services conduit application or installation, for instance, comprising suspended building services.
Figure 4D:
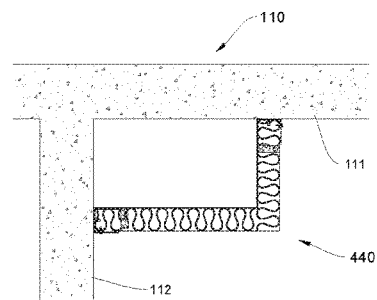
FIG. 4D shows the two-sided conduit configured for a horizontal or vertical air conduit application or installation.
Figure 4A:
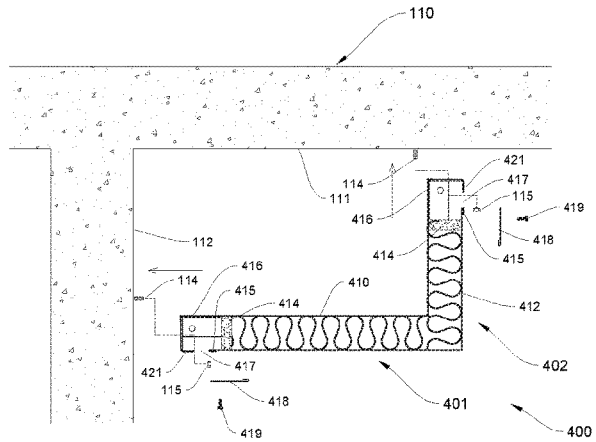
FIG. 4A shows a two-sided conduit configuration according to an embodiment of the present invention.

Reference is next made to FIG. 4A, which shows a sectional view of a two-sided conduit assembly according to an embodiment of the invention and indicated generally by reference 400. The two-sided conduit assembly 400 is configured to be secured and sealed against two surfaces of a fire barrier 110 indicated by reference 111 and 112, respectively, as shown in FIG. 4A. The two-sided conduit assembly 400 is suitable for applications where the porosity of the two surfaces of the fire barrier or separation floor or wall 110 does not adversely affect the performance of the system, for example, to enclose mechanical and/or electrical services, or to function as an air handling conduit, in horizontal or in vertical configurations.

The two-sided conduit 300 comprises an inner duct liner 410 and an outer casing 412. The outer casing 412 and the inner duct liner 410 are separated by casing spacers 414, for example, as described above. As shown in FIG. 4A, each side wall 401 and 402 of the conduit assembly 400 includes a conduit mounting channel indicated by references 416. The conduit mounting channel 416 is configured to provide a joining surface for mounting or securing the respective side wall 401, 402 to the respective surface 111, 112 of the fire barrier 110. According to an embodiment, a respective anchor or fastener 114 is installed in the surface 111, 112 of the fire barrier 110 and utilized to attach and secure the conduit mounting channels 416. According to an exemplary implementation, the fastener 114 comprises a threaded stud and the conduit mounting channel 416 (and side wall of the conduit assembly 401, 402) is attached with a threaded nut 115, which is accessed through an opening 417. As described above, the opening 417 may be filled with a thermal insulation material 435 (FIG. 4B) and the opening 417 and conduit mounting channel 416 is closed or sealed with a slide joint cover section indicated by reference 418. The joint cover section 418 is secured with one or more screws 419.

The conduit mounting channels 416 include a 90° fold or flange 421 which aligns with returns 415 on the outer casing 412, as shown in FIG. 4A.

To install the two-sided conduit 400, a gasket or other suitable sealing material is affixed or applied to the respective surfaces 111, 112 of the fire barrier 110 or to the faces of the conduit mounting channels 416, to create a seal between two mating surfaces and between the inner conduit 410 and the holes in the conduit mounting channel 416. The conduit assembly 400 is moved into position and secured with the conduit fastener or mounting nuts 115 to the respective anchors 114. Gaskets and/or sealing materials may be applied as required. The thermal insulation 435 is added in the cavity. The joint cover sections 418 include a slide or return 421 that is formed only along one longitudinal edge. The return 421 in the joint cover section 418 is slid over the corresponding return 415 in the outer casing 414 to interlock the two sections. The joint cover sections 418 are secured into place with joint cover section retaining screws 419, and the joint section in the two-sided conduit 400 is enclosed and configured to provide the required fire-rating. Adjacent conduit sections or modules for a run comprising the two-sided conduit assembly 400 are connected together in a manner similar to that described above with reference to FIG. 2.

Reference is next made to FIGS. 4B to 4D, which depict exemplary implementations and applications of the two-sided conduit assembly 400. FIG. 4B shows the two-sided conduit assembly 400 configured or installed as a services conduit, in a horizontal or a vertical configuration, and indicated generally by reference 420. In an exemplary installation, mechanical 422 and/or electrical 424 service fixtures or components, are affixed to a surface mount 426 and enclosed by the conduit formed between the two-sided conduit assembly 400 and the respective surfaces 111, 112 of the fire barrier 110. FIG. 4C shows the two-sided conduit assembly 400 configured as a services conduit 430 where the mechanical 422 and electrical services 424 are supported by a suspended mounting platform 432 as shown. FIG. 4D shows the two-sided conduit assembly 400 configured as an air conduit 440. The two-sided conduit assembly 400 can be configured to run a horizontal air duct or a vertical air duct according to the orientation of the fire barrier 110, e.g. ceiling or wall. In addition to the generally rectangular cross-sectional shape, the two-side conduit assembly 400 can be configured with duct sections having other profile shapes, for instance, a semi-circle or semi-oval shape.

Reference is next made to FIG. 5A, which shows a sectional view of a single-sided conduit assembly according to an embodiment of the invention and indicated generally by reference 500. The single-sided conduit assembly 500 is configured to be secured and sealed against a recess or channel 132 formed in a fire barrier 130, for example, comprising parallel fire-barrier projections or walls 134a and 134b, as shown in FIG. 5A. The single-sided conduit assembly 500 is suitable for applications where the porosity of the three surfaces of the fire barrier or separation floor or wall 130 and the projections or walls 134 do not adversely affect the performance of the system, for example, to enclose mechanical and/or electrical services, or to function as an air handling conduit, in horizontal or in vertical configurations.

The one or single-sided conduit 500 comprises an inner duct liner 510 and an outer casing 512. The outer casing 512 and the inner duct liner 510 are separated by casing spacers 514, for example, as described above. As shown, thermal insulation material 533 is placed in the void formed between the inner duct liner 510 and the outer casing 512 as shown in FIG. 5A. The single-sided conduct assembly 500 includes a conduit mounting channel at each end indicated by references 516. The conduit mounting channel 516 is configured to provide a joining surface for mounting or securing the conduit assembly 500 to the respective fire-barrier wall 134a and 134b. According to an embodiment, an anchor or fastener 136 is installed on a mounting surface of each fire-barrier walls 134a and 134b, as shown, and utilized to attach and secure the respective conduit mounting channels 516. According to an exemplary implementation, the fastener 136 comprises a threaded stud and the conduit mounting channel 516 is attached with a compatible threaded nut 137, which is accessed through an opening 517. In a manner similar to that described above, the opening 517 may be filled with thermal insulation material 519 (as shown in FIGS. 5B to 5D) and the opening 517 and conduit mounting channel 516 are closed or sealed with a slide joint cover section indicated by reference 518. The joint cover section 518 is secured with one or more screws 521 (FIGS. 5B to 5D).

To install the one-sided conduit assembly 500, a gasket or other suitable sealing material is affixed or applied to the respective mounting surfaces of the fire-barrier projections or walls 134a and 134b, to create a seal between two mating surfaces and between the inner conduit 510 and the holes in the conduit mounting channel 516. The conduit assembly 500 is moved into position and secured with the conduit fastener or mounting nuts 137 to the respective anchors 136. According to an embodiment, the joint cover sections 518 include a slide or return that is formed along one longitudinal edge. The return in the joint cover section 518 is slid over a corresponding return in the outer casing 514 to interlock the two sections. The joint cover sections 518 are secured into place with the joint cover section retaining screws 521, and the joint section in the single-sided conduit assembly 500 is enclosed and configured to provide the required fire-rating. Adjacent duct sections or module are connected together to form the one-sided conduit assembly in a manner similar to that described above.

Reference is next made to FIGS. 5B to 5D, which depict exemplary implementations and applications of the one or single-sided conduit assembly 500. FIG. 5B shows the one-sided conduit assembly 500 configured or installed as a services conduit, in a horizontal or a vertical configuration, and indicated generally by reference 520. In an exemplary installation, mechanical 522 and/or electrical 524 service fixtures or components, are affixed to a surface mount 526 and enclosed by the conduit formed between the one-sided conduit assembly 500 and the two fire-barrier walls or projections 134a and 134b of the fire barrier 130. FIG. 5C shows the one-sided conduit assembly 500 configured as a services conduit 530 where the mechanical 522 and electrical services 524 are supported by a suspended mounting platform 532 as shown. FIG. 5D shows the one-sided conduit assembly 500 configured as an air conduit 540. The one-sided conduit assembly 500 can be configured to run a horizontal air duct or a vertical air duct according to the orientation of the fire barrier walls or projections 134a and 134b, e.g. formed on the ceiling or on the wall of the fire barrier 130. In addition to the generally rectangular cross-sectional shape, the one-side conduit assembly 500 can be configured with duct sections having other profile shapes, for instance, a half-circle or half-oval shape.

As described above with reference to FIGS. 2A to 2D, the inner duct liners 230 include respective external mechanical connectors 232 at each end. According to this aspect of the present invention, the external mechanical connectors 232 are fabricated according to the intended application or operating environment of the fire-rated conduit assembly.

For installations involving hazardous or combustible materials or liquids, the connection must be liquid or air tight connection. According to an embodiment, the inner duct liner 230 is configured with a bolted flange connector as shown in FIGS. 6A and 6B, and indicated by reference 610. The bolted flange connector 610 comprises an angle flange indicated by reference 612 in FIGS. 6A and 6B. The angle flange 612 is affixed or attached to the end of the inner duct liner 230. As shown, the inner duct liner 230 may include a flange or lip 238 that is configured to also hold or attach the angle flange 612. According to an exemplary implementation, the traverse surface of the angle flange 612 is attached to the end edges of the inner duct liner 230 via continuous or stitch welding, and also along the end edges of the angle flange 612 adjacent the side edges of inner duct liner 230. According to another aspect, and where air or liquid tightness is required for the conduit, additional sealant is applied at the longitudinal joints or connectors to achieve the required seal. The vertical leg of each bolted flange connector 610 includes a plurality of holes for receiving mechanical fasteners, e.g. bolts sand nuts.

To provide increased rigidity for achieving tight (and leak proof) connections, the bolted flange connectors 610 comprise a SMACNA type angle connector, which is welded to the opposing ends of the inner duct liner 230, for example, as described above. The angle connectors are sized according to the conduit dimensions, and/or any internal pressure or material loading requirements.

As shown in FIGS. 6A and 6B, the casing spacers 248 are secured between the inner duct liner 230 and the outer casing 240. The casing spacers 248 are positioned to maintain a gap or void between the casing 240 and the duct liner 230 and ensure that thermal insulation 233 is equally compressed once the duct sections 210 are assembly together and the conduit assembly 100 is installed on site. The casing spacers 248 are configured to transfer loading from the inner duct liner 230 to the outer protective casing 240 and on to the mechanical structure supporting the assembly. The casing spacers 248 are made from a thermally insulative material which is strong or rigid enough to not be deformed or compressed, while also minimizing the amount of heat conducted though the spacer 248 to the unexposed face of the conduit. According to an exemplary implementation, the casing spacers 248 are formed from an insulation material such as cement or calcium silicate board. For higher load applications, the casing spacers 248 comprise one or more continuous configurations around the perimeter of the inner duct liner 230. For lighter load applications, on the other hand, the casing spacers 248 are segmented and positioned at the end sections of the inner duct liner 230, for example, as shown in FIG. 2B.

Referring back to FIGS. 6A and 6B, the casing spacer 248 is attached to the inner surface of the outer casing 240 utilizing mechanical fasteners 249, for example, metal screws, nails, or staples. According to another implementation, the casing spacer 248 is secured to the inner surface of the outer casing 240 utilizing a suitable adhesive. To maintain the integrity of the inner duct liner 230, the casing spacer 248 is not affixed to the outer surface of the inner duct liner 230. As shown, a casing spacer angle flange 614 is provided to locate and restrain the casing spacer 248 relative to the inner duct liner 230. The angle flange 614 is attached using continuous, stitch, or spot welding techniques. According to another implementation, the casing spacer 248 is secured to the outer surface of the inner duct liner 230 utilizing a suitable adhesive.

Figure 8A:
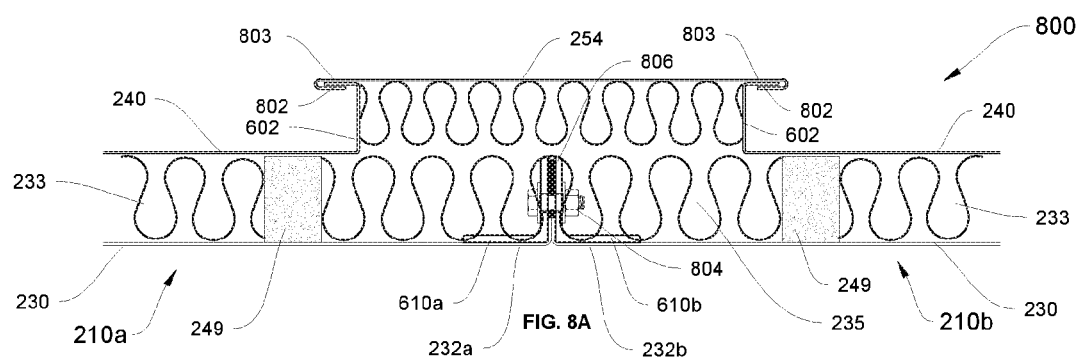
FIG. 8A shows a thin profile conduit with a raised joint cover according to an embodiment of the present invention.
Figure 8B:
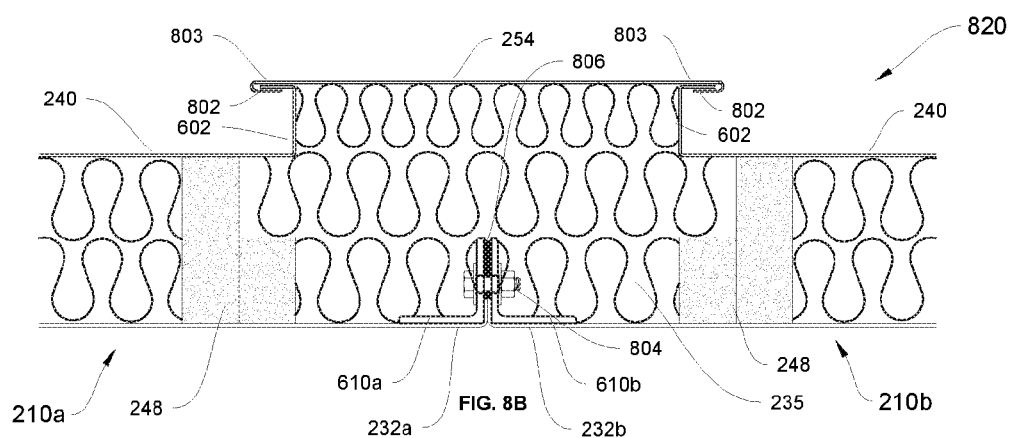
FIG. 8B shows a standard profile conduit with a raised joint cover according to an embodiment of the present invention.

As shown in FIG. 6A, the outer casing 240 is configured with a raised joint attachment end which is formed "proud" of the casing 240, as indicated by reference 602. The raised joint attachment end 602 is configured to receive and secure the joint covers 254 in a raised configuration in duct assemblies 800 and 810, as shown in FIGS. 8A and 8B, respectively. The raised joint attachment 602 includes a return 802 which is configured to interlock with a corresponding return 803 (e.g. connection edge or mechanism) formed on each edge of the joint cover 254. According to an exemplary embodiment, the return 803 comprises a pocket or formed slot as shown in FIG. 8A (FIGS. 8B and 8C) which slides over and receives or engages the return 802 formed in the outer casing. The inner duct flange connectors 232a (i.e. the bolted flange connector 610*a*) and 232*b* (i.e. the bolted flange connector 610*b*) are secured together with mechanical fasteners 804, for instance bolts and nuts, as shown in FIGS. 8A and 8B. According to an exemplary implementation, a gasket 806, or a suitable sealant, is applied between the mounting faces of the bolt flange connectors 610. The cavity or void between the adjacent duct sections 210 is filled with thermal insulation material 235, and the joint cover 254 is slid into place in the raised joint attachments 602, and may be further secured by one or more mechanical screws. The duct assembly 800 with the raised joint attachment in FIG. 8A comprises a thin profile conduit assembly (and includes thinner casing spacers 249), whereas the duct assembly 820 in FIG. 8B comprises a standard profile for the conduit assembly.

The duct assembly 800 depicted in FIG. 8A is configured for application or installations where fire-rating durations of 2 hours or less are required. Due to the physical characteristics of a thinner configuration the weight of materials/components and loading will be lower, and therefore smaller/thinner casing spacers 249 can be utilized, and with the raised joint cover configuration standard, or additional thickness, thermal insulation material 235 can be utilized based on the rating.

The duct assembly 820 depicted in FIG. 8B is configured to provide a fire-rating of 4 hours or less. The configuration of the raised joint casing provides a larger cavity for receiving additional or thicker material for the thermal insulation 235.

Reference is next made to FIG. 6B, which shows the outer casing 240 configured with a flat joint attachment end indicated by reference 622. As shown the flat joint attachment end is formed substantially flush with the exterior surface of the outer casing 240. The flat joint attachment configuration provides a conduit assembly with smaller outer dimensions. To maintain or increase fire-ratings, thermal insulation 235 with higher performance characteristics is utilized, for example, the thermal insulation 235 will have higher performance characteristics than the thermal insulation 233 between the inner duct liner 230 and the outer casing 240.

Figure 8C:
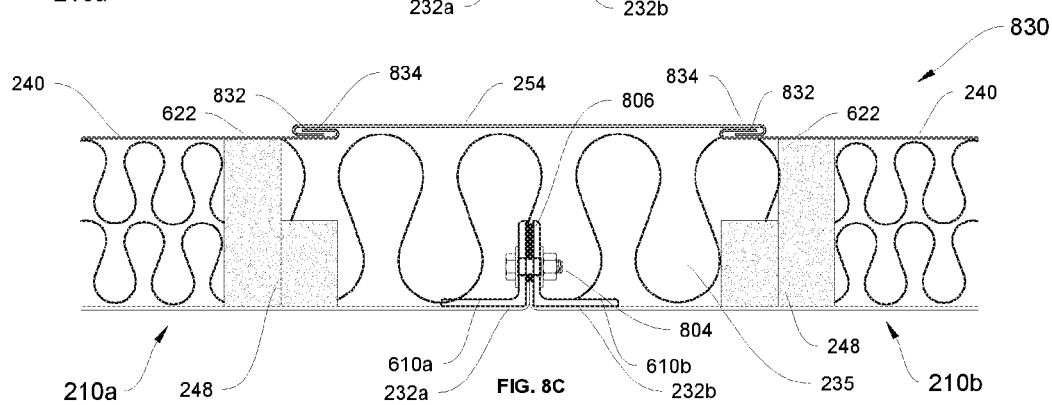
FIG. 8C shows a standard profile conduit with a flush joint cover according to an embodiment of the present invention.

The flat joint attachment end 622 is configured to receive and secure the joint covers 254 in a flat configuration in a duct assembly 830, as shown in FIG. 8C. The flat joint attachment 622 includes a return 832 which is configured to interlock with a corresponding return 834 formed on each edge of the joint cover 254. The inner duct flange connectors 232*a* (i.e. the bolted flange connector 610*a*) and 232*b* (i.e. the bolted flange connector 610*b*) are secured together with mechanical fasteners 804, for instance bolts and nuts, as shown in FIG. 8C. A gasket 806, or a suitable sealant, is applied between the mounting faces of the bolt flange connectors 610. The cavity or void between the adjacent duct sections 210 is filled with a thermal insulation material 235, and the joint cover 254 is slid into place in the flat joint attachments 602.

The duct assembly 830 depicted in FIG. 8C comprises a standard profile conduit assembly and is configured to provide a fire-rating of 4 hours or less. The flat or flush mounting of the joint covers 254 reduce the thickness of the thermal insulation 235 at the inner conduit external connectors, which effectively reduces the thermal protection. To limit the thermal transfer (thereby increase the fire-rating) between the inner duct liner 230, the external connectors and the joint cover 254, the thermal insulation 235 comprises an insulating material with a lower thermal conductivity and/or higher density, in order to meet established thermal transmission parameters.

For an installation comprising standard supply, return, or exhaust air applications, as well as for electrical service applications where fire resistance is the primary concern, the external mechanical connectors 232 are formed as an integral component of the inner duct liner 230, or alternatively, as a separate component that is affixed or attached to the end of the inner duct liner 230. According to an exemplary implementation, the external mechanical connector 232 comprises a SMACNA type T-25 series connector, which has a profile similar to that shown in FIGS. 6C and 6D. Other SMACNA or similar mechanical connectors can be used for the external mechanical connector 232 provided the resulting connection between duct modules 210 meets the required fire-ratings for the application or installation.

The duct assemblies according to FIGS. 6C and 6D are particularly suited for applications comprising conduits for moving air under positive or negative pressure, as well as conduits containing mechanical or electrical services. It will be appreciated that these applications do not necessarily require conduit assemblies with liquid and joint tight configurations as described above with reference to FIGS. 6A and 6B.

Reference is made to FIG. 6C, which shows a duct assembly 630 configured with a raised joint attachment end which is formed "proud" of the casing 240, as indicated by reference 631. The raised joint attachment end 631 is configured to receive and secure the joint covers 254 in a raised configuration, in a manner similar to that described above with reference to FIG. 6A. It will be appreciated that the configuration of the raised joint attachment provides increased rigidity to the lateral edges of the outer casing 240, in addition to providing a larger joint cavity for receiving additional or thicker thermal insulation material 235 (FIG. 8).

According to another aspect and as shown in FIG. 6C, the exterior connector 232 for the inner duct liner 230 comprises a SMACNA type T-25 series connector indicated by reference 634. The connector 634 is formed as an integral component of the end section of the inner duct liner 230, or as a separate component which is mechanically attached to the end of the inner duct liner 230. According to an exemplary implementation, the T-25 connector 634 is configured for a "four bolt connection" at the four corners of the exterior connector 232. For larger conduit sizes or installation, the exterior connector 232 can be configured with additional holes for receiving additional bolt and nut fasteners.

As also shown in FIG. 6C and according to an exemplary implementation, the casing spacer 248 is mechanically fastened to the outer surface of the inner duct liner 230, for example, using one or more mechanical fasteners indicated generally by reference 231. According to another implementation, the casing spacer 248 is secured to the outer surface of the inner duct liner 230 utilizing a suitable adhesive.

It will be appreciated that the raised joint cover attachment configuration provides additional rigidity to the lateral edges of the outer casing 240. In addition, the size of the angle flange 612 can be varied, for example, increased in size to provide increased thermal insulation at the joint formed between adjacent duct modules.

Reference is next made to FIG. 6D, which shows the outer casing 240 configured with a flat joint attachment end indicated by reference 642. The flat joint attachment end 642 is formed substantially flush with the exterior surface of the outer casing 240. The flat joint attachment end 642 is configured to receive and secure the joint covers 254 in a flat or substantially flush configuration, in a manner similar to that described above with reference to FIG. 6B. As also described above, the flat joint attachment configuration provides a conduit assembly with smaller outer dimensions.

As also shown in FIG. 6D, the exterior connector 232 for the inner duct liner 230 comprises a SMACNA type T-25 series connector 634 as described above. The connector 634 is formed as an integral component of the end section of the inner duct liner 230, or as a separate component which is mechanically attached to the end of the inner duct liner 230, as also described above.

The exterior of the duct assembly 100 and 110 comprises the outer casing 240, which according to an exemplary implementation comprises a metallic material formed from flat sheet metal or continuous strip. The outer casing 240 is formed or fabricated with a minimum thickness required to remain intact and maintain the protective casing shape and integrity for the duration under the required fire-rating.

Using known techniques as will be within the understanding of those skilled in the art, the outer protective casing is formed into a tube from a single or multiple pieces of metal to create a cross-section as described herein. According to another aspect, rectangular or square cross-sections can be fabricated utilizing four individual panels, a 'U' shaped bottom with a separate top panel, two 'L' shaped sections or a single wrap around section. Round and oval cross-sectional profiles for the outer casing 240 can be formed from individual pieces of flat metal or created from a spirally wound continuous strip of metal. In known manner, the abutting longitudinal free edges of the formed or spirally wound tubes are joined or connected using mechanical locks, continuous or stitch welds, lap seams with fasteners or spot welds or pocket seams with fasteners or stitch welds.

As described above, the opposite ends of each of the outer casing panels or tubes have an integrally formed return, or added, to each panel or tube edge. The returns on the outer casing can be formed or comprise a raised joint cover configuration or a flat or flush joint cover configuration, with the returns running parallel to the edges of the outer casing and located adjacent to the outer casing, as described above.

Figure 7A:
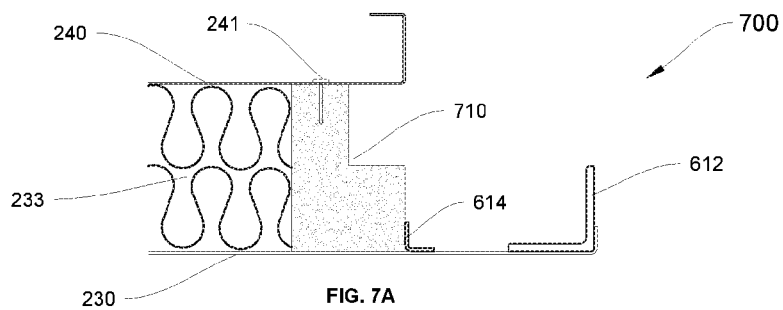
FIG. 7A shows a stepped casing spacer according to an embodiment of the present invention.
Figure 7B:
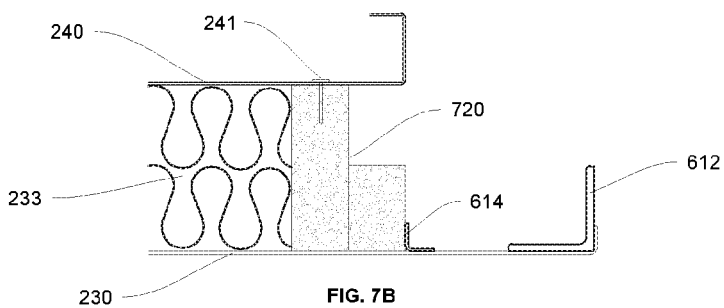
FIG. 7B shows a built-up stepped casing spacer according to an embodiment of the present invention.
Figure 7C:
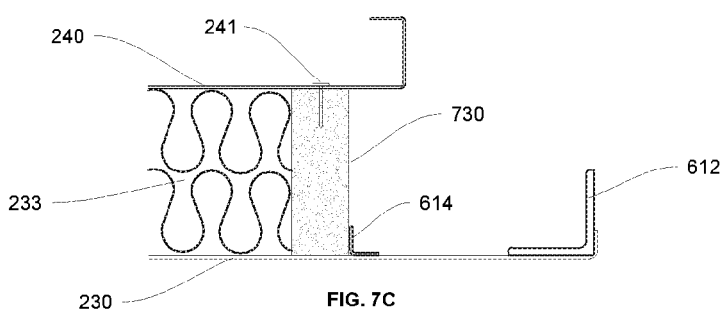
FIG. 7C shows a flat casing spacer according to an embodiment of the present invention.

Reference is next made to FIGS. 7A to 7C, which show the casing spacer according to other embodiments or implementations. To achieve the thermal transmission requirements for a fire-rating, the cavity formed between the inner duct liner 230 and the outer casing 240 is filled with thermal insulating material 233 as described above. According to an exemplary implementation, the thermal insulating material has a sufficient thickness and composition to provide the required thermal resistance to limit the temperature rise through the insulating material to an average of 250° F. (139° C.) or to a maximum single measurement of 325° F. (180° C.) when tested for the required fire-rating duration. The thermal insulating material comprises a batt or blanket material, which allows an insulation layer to be formed around the exterior surface of the inner duct liner, or around the corners of the square and rectangular sections. According to another implementation, the thermal insulating material is formed in boards or sheets. According to another implementation, the thermal insulating material is comprised of loose insulating fibers, granules, or powder. Suitable compositions for the thermal insulating material include soluble ceramic, or mineral or rock wool compositions (particularly suited for larger insulation cavities).

As described above, the casing spacers 248 are configured to create a cavity or space between the inner duct liner and the outer casing for containing a thermal insulation material without unnecessary compression. The casing spacers 248 are configured to transfer the load from the inner duct liner 230 though to the outer casing 240 and any connected support structures or surfaces. The casing spacers are typically located in the end section of the duct or conduit module. For configurations with higher loads, one or more additional and intermediately located casing spacers are utilized (for example, as described above).

Reference is made to FIG. 7A, which shows a duct or conduit module 210 with a stepped casing spacer according to an embodiment and indicated by reference 710. The stepped configuration is particularly suited to materials that are less compressible in order to hold the insulation material in place and also providing structural integrity for installing the joint covers. As shown, an angular retainer 614 is also provided to secure the casing spacer 248. FIG. 7B shows another embodiment of a stepped casing spacer 720 comprising first 721 and second 722 sections. The stepped casing spacer 720 is secured by the angular retainer 614 as shown. According to another embodiment, the casing spacer comprises a single column or support structure as shown in FIG. 7C and indicated by reference 730. This configuration is suited for use with thermal insulation 233 that is compressible and will stay in place through friction with adjacent surfaces.

According to another aspect, the casing spacers 248 are configured to also function as connectors to secure the inner duct liner 230 to the outer casing 240 and reduce shifting or movement between the outer casing 240 and the inner duct liner 230 during shipping and installation.

As shown in FIGS. 7A to 7C, the outer casing 240 is mechanically fastened to one end of the casing spacer 248, for example, utilizing mechanical fasteners such as staples, nails, or screws. It will be appreciated that the connection techniques for coupling the outer casing 240 to the inner duct liner 230 will depend in part on the application of the duct assembly. For typical air handling applications where absolute liquid and air tightness is not required, mechanical fasteners 231 (similar to the mechanical fasteners 241 used to connect the outer casing 240 to the casing spacer 248) are utilized to attach the inner duct liner 230 as shown in FIGS. 6C and 6D. The fasteners 231 can be sealed as needed. For applications or installations requiring a liquid tight seal or for applications involving combustible materials, the casing spacers 248 are secured to the inner duct liner 230 utilizing the retainer angles 614, as shown in FIGS. 6A and 6B. As described above, the retainer angles 614 are affixed to the exterior surface of the inner duct liner 230, for example, utilizing spot, stitch, or continuous welding techniques. The retainer angle 614 will have a size, thickness, and length based on the dimensions of the inner duct liner 230 and/or the loading characteristics.

Reference is next made to FIGS. 9A and 9B, which show joint cover configurations according to other embodiments of the present invention. The embodiments depicted in FIGS. 9A and 9B are suited for installations having tight clearances or other obstructions where there is insufficient space to utilize slide joint covers as described above.

FIG. 9A shows a raised joint cover configuration indicated by reference 900 comprising a raised return 910 on each end of the outer casing 240. The joint cover 254 comprises a fold 912, for example, a 90° fold, formed along each longitudinal edge. The folds 912 can be factory formed, or field modified. As shown, the joint cover 254 is attached to the respective raised returns 910 utilizing mechanical fasteners 911, for instance, screws inserted through the folds 912 and secured into the returns 910 on the outer casing 240. The mechanical joint that is formed also provides increased rigidity to the lateral edges of the outer casing.

FIG. 9B shows a flat joint cover configuration 920 for screw attachment. As shown, the flat joint cover 920 comprises a slight fold 922 along each longitudinal edge. The slight fold 922 can be factory formed or field modified. Each end of the outer casing 240 is configured with a flush return 924. The flat joint cover 920 is secured to the outer casing 240 using screws 923 fastened through the slight folds 922 into the respective flush returns 924, as shown in FIG. 9B. It will be appreciated that this configuration provides additional edge stiffness or rigidity and field installation is facilitated because the slight fold 922 comprises a single material thickness for attaching the joint cover 920.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

I claim:

1. A modular conduit assembly, said modular conduit assembly comprising:
    two or more duct sections;
    each of said duct sections having an inner duct liner, an outer casing, and a plurality of casing spacers configured to form a thermal insulating cavity between at least a portion of space between said inner duct liner and said outer casing, said thermal insulating cavity being configured for receiving a thermal material;
    said inner duct liner comprising a metallic material having a thickness for providing a specified fire-rating;
    wherein each casing spacer of said plurality of casing spacers has (i) a mounting surface, and said mounting surface is mechanically affixed with a mechanical fastener to an inner surface of said outer casing, and having (ii) another mounting surface, and said other mounted mounting surface being configured to abut against the outer surface of said inner duct liner without being affixed to the outer surface of said inner duct liner so as to maintain the structural integrity of said inner duct liner, and further including (iii) a casing spacer flange affixed to the outer surface of said inner duct liner and configured to restrain said respective casing spacer;
    a first exterior flange connector attached to one end of each of said inner duct liners;
    a second exterior flange connector attached to another end of each of said inner duct liners;
    said first and said second exterior flange connectors being configured to form an assembly junction for coupling respective ends of said duct sections to form a connected run of said duct sections; and
    a joint connection end formed between said exterior flange connector and said outer casing, said joint connection end being configured to receive a joint insulating material, and further comprising a return configured for receiving a connection edge of a joint cover, said joint cover being configured to encapsulate said joint connection ends of adjacent duct sections modules.

2. The modular fire-rated conduit assembly as claimed in claim 1, further comprising a thermal insulation material placed inside the thermal insulating cavity.

3. The modular fire-rated conduit assembly as claimed in claim 1, wherein said plurality of casing spacers are configured to couple said inner duct to said outer casing so as to prevent movement between said inner duct and said outer casing and maintain said thermal insulating cavity.

4. The modular fire-rated conduit assembly as claimed in claim 3, wherein said thermal insulating cavity comprises a volume based on the thermal conductivity of said thermal material and the fire-rating specified for the conduit assembly.

5. The modular fire-rated conduit assembly as claimed in claim 1, wherein said joint cover comprises two parallel longitudinal edges and each of said longitudinal edges includes a return configured to engage the corresponding return formed on the edge of said outer casing.

6. The modular fire-rated conduit assembly as claimed in claim 1, wherein said joint cover comprises two parallel longitudinal edges and each of said longitudinal edges comprise a formed bend, and said formed bend being configured to be secured to the surface of said return formed on the edge of said outer casing.

7. The modular fire-rated conduit assembly as claimed in claim 1, wherein said duct section comprises a cross-sectional profile, and said cross-sectional profile is one of round, oval, square and rectangular.

8. The modular fire-rated conduit assembly as claimed in claim 7, wherein said inner duct liner comprises a metallic sheet having a thickness according to a specified fire-rating, and said inner duct liner being formed from flat metallic pieces, or from a continuous metallic strip, and wherein the free longitudinal edges of said formed inner duct liner being joined using one of mechanical locks, mechanical fasteners with lap or pocket seams, continuous welds and intermittent welds.

9. The modular fire-rated conduit assembly as claimed in claim 7, wherein said outer casing is formed into a tube from a plurality of flat metal pieces having a thickness according to a specified fire-rating, and wherein the free longitudinal edges of said outer casing being joined using one of mechanical locks, mechanical fasteners with lap or pocket seams, continuous welds and intermittent welds.

* * * * *